United States Patent [19]

Lee

[11] Patent Number: 5,099,265

[45] Date of Patent: Mar. 24, 1992

[54] COMBINATION OPTICAL AND ELECTRONICAL VIEWFINDER

[76] Inventor: Sang J. Lee, 999-25, Hogai-Dong, Anyang City, Gunggi-Do, Rep. of Korea

[21] Appl. No.: 511,650

[22] Filed: Apr. 20, 1990

[30] Foreign Application Priority Data

Apr. 29, 1989 [KR] Rep. of Korea ............... 5705/1989

[51] Int. Cl.⁵ .................. G03B 13/02; H04N 5/30
[52] U.S. Cl. .................................. 354/219; 358/224
[58] Field of Search ............. 354/219, 220, 221–225; 358/909, 906, 224

[56] References Cited

U.S. PATENT DOCUMENTS

| | | | |
|---|---|---|---|
| 4,330,797 | 5/1982 | Yokokawa et al. | 358/224 |
| 4,409,619 | 10/1983 | Takubo et al. | 358/224 |
| 4,571,627 | 2/1986 | Stempeck | 358/906 X |

Primary Examiner—L. T. Hix
Assistant Examiner—Jae N. Noh
Attorney, Agent, or Firm—Anthony J. Casella; Gerald E. Hespos

[57] ABSTRACT

A combination optical and electronical viewfinder is provided to have both an optical systems and and electronical system in combination for the viewfinder of a camcorder for selecting either one of the two systems by a simple mainpulation of a mirror for pivoting to a position within the viewfinder casing to interrupt the path of light for or against one of the systems. The mirror is disposed between an eye lens and an objective lens within the viewfinder casing and is arranged to be pivotable on a hinge pin with the help of guides in the side walls of the casing. A picture tube for the electronical system is disposed perpendicular to the casing underneath it with a through opening in the casing wall to give image to the mirror for reflection toward the eye lens.

8 Claims, 2 Drawing Sheets

COMBINATION OPTICAL AND ELECTRONICAL VIEWFINDER

BACKGROUND OF THE INVENTION

1. Field of the Invention

This invention relates to a viewfinder for camcorder and more particularly to combination optical and electronical viewfinder integrally having a conventional electronic viewfinder and a conventional optical viewfinder for a user to select by a simple manipulation either an electronic function or an optical function as suited for actual picture taking.

2. Description of the Prior Art

Conventionally, the construction of an electronic viewfinder, as shown in FIG. 1 hereafter, has been in general use for camcorders. According to the system, the information of an image taken by a lens mounted on the front top of the camcorder body is converted into a predetermined image signal to be reproduced as a picture on a CRT 23' through an image signal input terminal 26' of the viewfinder 2' positioned on the top of the camcorder body, the picture being enlarged by the magnifying lens 27 for the photographer's view.

The above electronic viewfinder is certainly advantageous to the user fact that the same picture as the image taken by the lens is to be presented for the user. Yet, for a camcorder placing importance on the nature of lightness and miniature in construction, however, the necessity of a black-and-white picture tube in ½" or ⅜" size inevitably reproduces only black-and-white pictures to result in the user's difficulty of satisfactorily recognising the actual condition of an object for photography due to the monochrome on the screen. In addition, such a difficulty brings a subsequent fatigue of eyes in a long use of the camcorder.

SUMMARY OF THE INVENTION

This invention is desinged to overcome the above problem in the prior art and its construction includes in a casing of light weight, an objective lens and an eye lens both arranged for optically viewing objects through the lenses, and a reflex mirror disposed between the lenses and arranged to pivot from a horizontal position to a position at 45 degree angle. Underneath the mirror there is also provided a picture tube with attachments for electronically viewing the image of objects.

Figure 1:
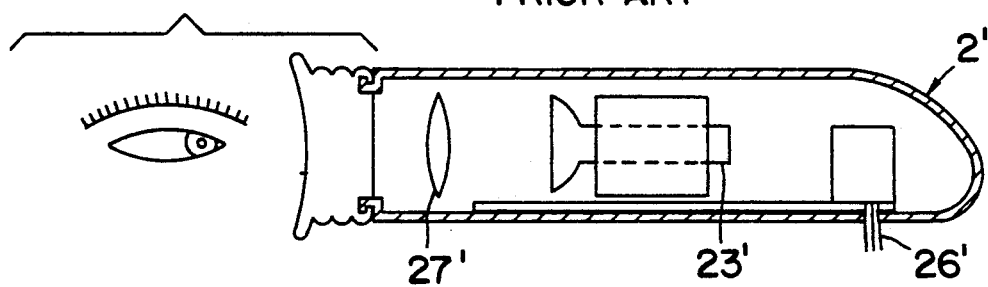
FIG. 1 shows a sectional view of a conventional viewfinder.

Numerals in the drawings indicate the following;

Numeral 1 indicating a camcorder, 2 a viewfinder, 4 a mirror, 5 a mirror case, 22 a casing, 22a an opening, 23 a picture tube, 27 an eye lens, 28 an objective lens, 52 an elastic plate, 54 a tapered projection, 55 an elastic switch, 215 a projection, 216 a guide hole, 216a a lock hole.

DETAILED DESCRIPTION OF THE INVENTION

Figure 2:
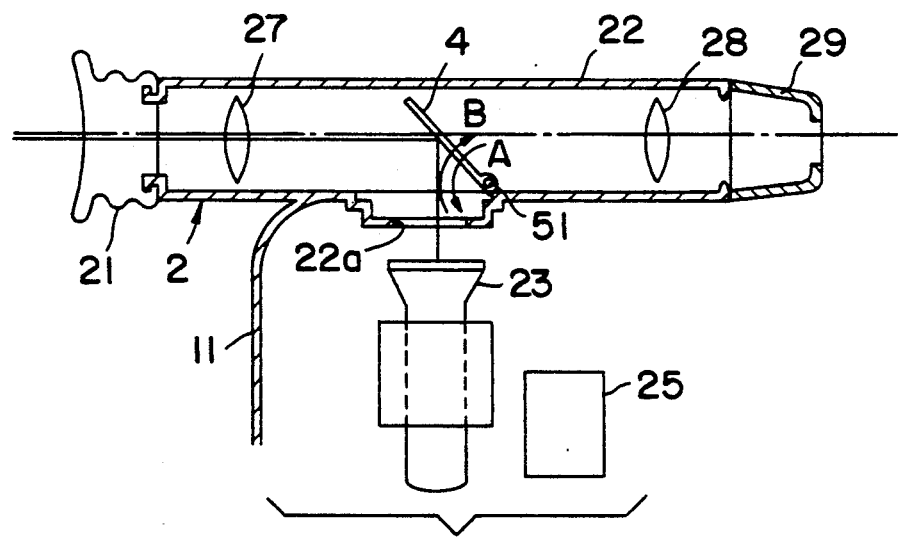
FIG. 2 shows a sectional view of an embodiment of the invention.
Figures 4A, 4B:
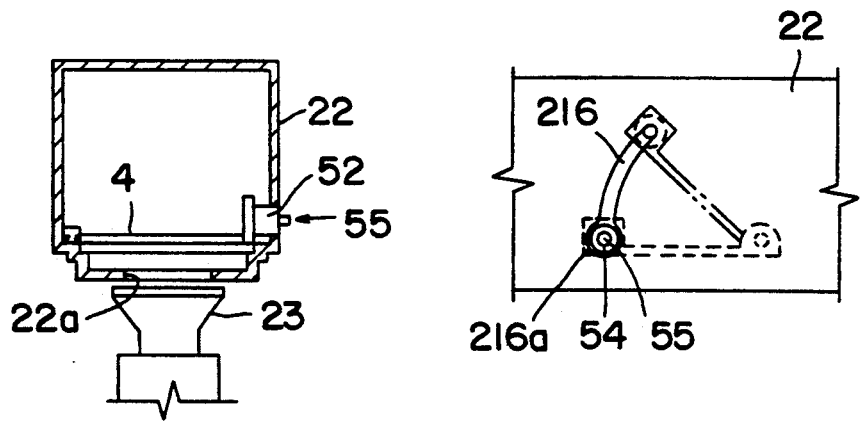
FIGS 4A and 4B show the operational flows of the reflex mirror relative to the mirror case.
Figure 3:
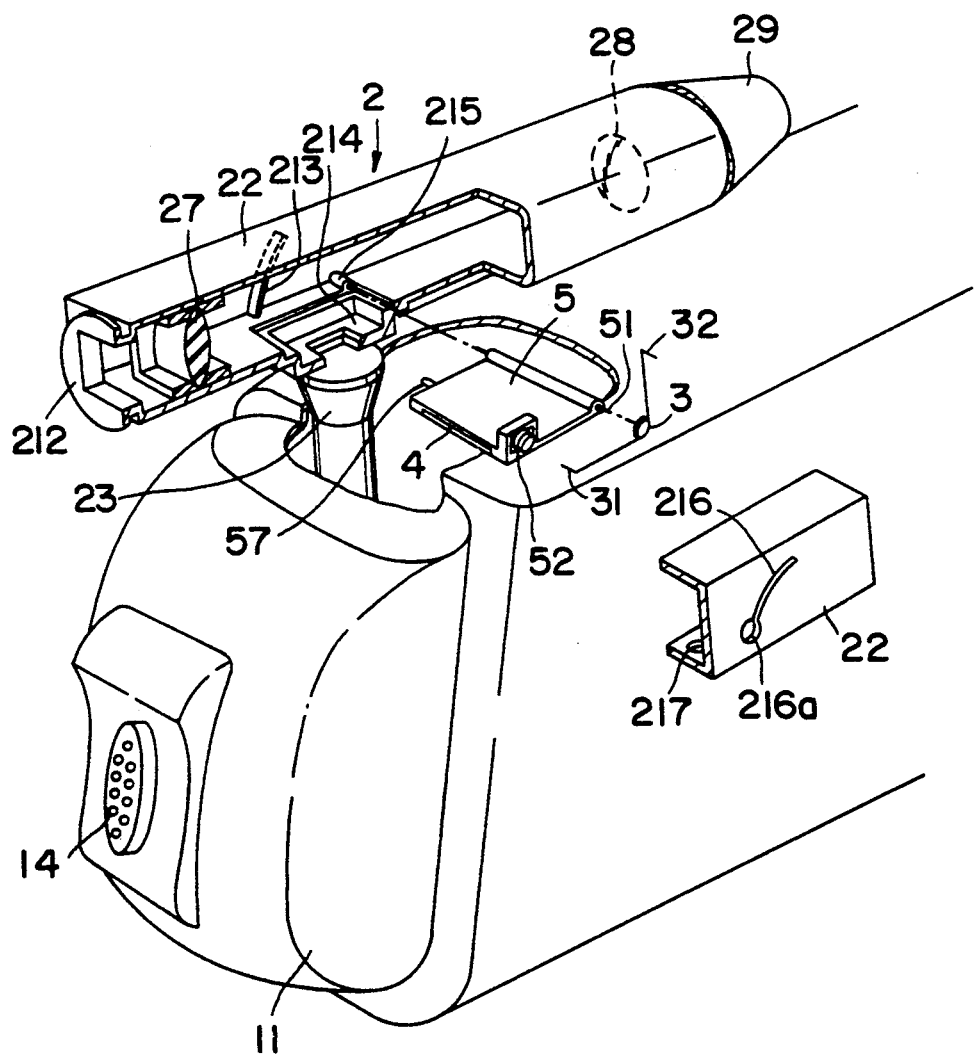
FIG. 3 shows a perspective view of a partically cut-away viewfinder on a camcorder with its case also partially cut-away for showing the construction of the invention.

Referring to FIGS. 2-4, a viewfinder 2 mounted on top of the main body 11 of a camcorder comprises a casing 22, an eye lens 27 and an objective lens 28 both being disposed within the casing 22, an eye contact hood 21, and an objective lens hood 29, the casing 22 having an opening 22a at the bottom between the two lenses.

On a side of the opening 22a the bottom of the case 22 is provided with a projection 215 having a hole, which receives a hinge pin 51 being placed through a horizontal hole provided on a side edge of the mirror case 5 holding a mirror 4 so as to pivot the case 5 with the mirror 4 on the hinge pin in the casing 22.

The hinge pin 51 has a torsion spring 3, its one end 31 being fixed to the inner side of the casing 22 and the other end 32 being hooded on the mirror case 5 to give elasticity to the mirror case.

An elastic piece 52 and a guide pin 57 are provided to protrude outward from respective sides of the mirror case 5, the elastic piece 52 being provided with a tapered projection 54 at the front end to further have a combination guide projection and elastic switch 55.

To guide the elastic piece 52 along its operational arc curve for swinging the mirror, a side wall of the casing 2 is provided with an arc shaped guide opening 216 having at the lower end a lock hole 216a in a diameter larger than the width of the opening 216. Also, on the inner wall opposite to the wall having the opening 216 there is provided a projective guide member 213 of the same arc shape as that of the opening 216 such that the guide pin 57 of the mirror case 5 moves in contact with the arc member 213 while the projective switch 55 of the elastic piece 52 is received in the guide opening 216 so as to pivot the mirror case 5 with the guide of the opening 216 from the horizontal position up to the position at the angle of 45 degree.

According to the construction of the invention, the elastic piece 52 of the mirror case 5 protrudes out through the guide opening 216 of the viewfinder wall so that a user may select either the optical system or the electronical system of the viewfinder by manipulation of the elastic switch 55 in the guide opening.

For selecting the electronic viewfinder system, the elastic switch 55 held in the lock hole 216a of the guide opening 216 is pressed to release the tapered projection 54 from the lock hole and move with a hand the projective switch 55 upward along the guide opening 216 so as to pivot the mirror case 5 on the hinge pin received in the projection 215 up to the angle of 45 degree.

Thereafter, the elastic switch 55 is released from the hand for the elasticity of the switch to urge the tapered projection 54 against the side of the opening 216 and keep the mirro case 5 in slant of 45 angle, thus forming an electronic viewfinder as shown in FIG. 2. That is, the image of an object shown on the screen of the picture tube 23 is reflected from the mirror in slant at the angle of 45 degree to be viewed by the user through the eye lens 27.

For selecting the optical viewfinder system, the elastic switch 55 held on the upper side of the opening 216 is pressed for the tapered projection 54 to be released from the opening and return to the original position, such that the mirror case 5 pivots to be horizontal in level from the 45 angle to the 0 angle for the tapered projection 54 to be locked in the lock hole at the bottom of the guide opening 216. Consequently, the mirror 4 shuts the opening 22a to cut off the path of the beam from the electronic system and open the path between the lens 27 and the objective lens 28 to provide a view of the object through the opening at the front tip for the function of the optical viewfinder system.

As shown in the above, in a long distance shooting which gives no trouble arising from a difference between the actual view to be taken and the view seen through the viewfinder due to the difference between the two optical axes of the camcorder, this invention provides an advantages of selectively employing one of the two viewfinder systems for the user as suited.

Besides, a switching of the viewfinder from an electronic system to an optical system may relieve the user's boredom of fatigue arising from viewing long the black-and-white pictures and brings a very effective shooting of a scene where colors are important, to improve the function and utilization of the camcorder.

I claim:

1. A viewfinder for a video camera recorder, comprising:

optical image receiving means having an objective lens arranged within one end of a casing of said viewfinder, and an eye lens arranged within the other end of said casing of said viewfinder, whereby an image is viewed through said objective lens and said eye lens;

electronic image receiving means having lens system, of which an image pickup element converts optical image into video signal, and of which a picture tube is disposed perpendicular to said casing; and selecting means for selecting one of said optical image receiving means and said electronic image receiving means, having a mirror pivotably disposed between said eye lens and said objective lens, wherein said mirror is disposed to be able to reflect the image from said picture tube to said eye lens through an opening of a wall of the casing.

2. A viewfinder for a video camera recorder as claimed in claim 1, comprising:

an arc shaped guide member provided on an inner wall of the casing adjacent the opening, a guide opening having a lock hole and provided in the casing wall, a mirror case having a reflex mirror fixed on an underside of the mirror case, said mirror case being hinged on a pin received through a side edge of the mirror case into a hole in a protrusion adjacent the opening, the mirror case having a tapered projection and an elastic switch both integrally formed on a side and also having a protective guide member integrally on another side for the protective members to be respectively guided by the opening and the protective guide member for pivoting the mirror into a position to switch the view path for one of the two image receiving means by manipulation of the elastic switch.

3. A viewfinder for a video camera recorder, said video camera recorder including electronic image receiving means for converting optical images into video image signals, said viewfinder comprising:

an elongated casing having opposed first and second ends, each said end having aperture means formed therein for permitting passage of light corresponding to an optical image through the casing from the first end to the second end thereof;

a picture tube operatively connected to the video camera recorder for receiving the video image signals of the video camera recorder and converting said video image signals into video images, the picture tube being aligned to project the video image along an axis extending generally perpendicular to the elongated casing of the viewfinder; and a mirror pivotably mounted in the casing for rotation between a first position where said mirror substantially blocks the video images from the picture tube and permits direct transmission of light through the casing from the first end thereof to the second end, and a second pivotable position where said mirror substantially blocks transmission of light through the casing from the first end thereof to the second end and permits reflection of video images from the picture tube to the second end of the casing, whereby the selective pivotable movement of the mirror enables the viewfinder to selectively employ either direct optical image signals passing through the casing or video images transmitted from the picture tube.

4. A viewfinder as in claim 3 wherein in the second position, the mirror is aligned approximately at a 45° angle to the axis of the video images from the picture tube.

5. A viewfinder as in claim 4 further comprising an optical image receiving means disposed in the casing and comprising an objective lens disposed in proximity to the first end of the casing and an eye lens disposed intermediate the mirror and the second end of the casing.

6. A viewfinder as in claim 4 further comprising selecting means for enabling pivotable movement of the mirror between the first and second positions.

7. A viewfinder as in claim 6 wherein the selecting means comprises a portion disposed externally of the casing to enable manual pivoting of the mirror between the first and second pivotable positions.

8. A viewfinder as in claim 7 wherein the selecting means comprises means for releasably locking the mirror in each of the first and second pivotable positions.

* * * * *